United States Patent
Loisel et al.

(10) Patent No.: US 8,220,176 B2
(45) Date of Patent: Jul. 17, 2012

(54) GAUGE FOR MOUNTING A SCREW

(75) Inventors: Patrice Loisel, Bolbec (FR); Xavier Holay, Le Havre (FR); Ghislain Fauquet, Le Havre (FR); Matthieu Laurent, Bolbec (FR)

(73) Assignee: Aircelle (FR)

( * ) Notice: Subject to any disclaimer, the term of this patent is extended or adjusted under 35 U.S.C. 154(b) by 37 days.

(21) Appl. No.: 12/865,066

(22) PCT Filed: Jan. 28, 2009

(86) PCT No.: PCT/FR2009/000096
§ 371 (c)(1),
(2), (4) Date: Jul. 28, 2010

(87) PCT Pub. No.: WO2009/112696
PCT Pub. Date: Sep. 17, 2009

(65) Prior Publication Data
US 2010/0325908 A1 Dec. 30, 2010

(30) Foreign Application Priority Data
Jan. 30, 2008 (FR) ...................... 08 00502

(51) Int. Cl.
*G01B 5/00* (2006.01)
(52) U.S. Cl. ............... 33/613; 33/679.1; 33/542
(58) Field of Classification Search ........... 33/613, 33/679.1, 542, 836
See application file for complete search history.

(56) References Cited

U.S. PATENT DOCUMENTS

| | | | | |
|---|---|---|---|---|
| 1,287,040 A | * | 12/1918 | Junker | 33/679.1 |
| 1,375,747 A | * | 4/1921 | Zigray | 33/810 |
| 1,501,947 A | * | 7/1924 | Hillman | 33/679.1 |
| 2,295,783 A | * | 9/1942 | Greenleaf | 33/679.1 |
| 2,895,225 A | * | 7/1959 | Eisele | 33/542 |
| 2,896,333 A | * | 7/1959 | Kivela | 33/679.1 |
| 3,015,892 A | * | 1/1962 | Stuart | 33/542 |
| 4,033,043 A | * | 7/1977 | Cunningham | 33/806 |
| 4,892,449 A | * | 1/1990 | Croxton | 411/54 |
| 6,131,302 A | * | 10/2000 | Hohmann et al. | 33/833 |

* cited by examiner

Primary Examiner — Christopher Fulton
(74) Attorney, Agent, or Firm — Cantor Colburn LLP

(57) ABSTRACT

This gauge for mounting a screw in a cage nut or in a nut (23), with the aim of assembling at least two parts (13, 15), comprises a shank (37) with a smooth section (39) having graduations (47) and with a threaded end (41), which are similar to those of said screw. A sleeve (49) is slidably mounted on said smooth section (39). The axial length of said sleeve (49) and the distribution of said graduations (47) are such that, when the shank (37) of said gauge is screwed as far as it will go into said cage nut or into said nut (23) and when said sleeve (49) is pressed against one (13) of said two parts (13, 15), the graduation indicated by said sleeve (49) on said smooth section (39) is representative of the distance separating the thread (43) of said cage nut or said nut (23) from the outer surface of the part (13) situated facing away from this cage nut or said nut (23).

11 Claims, 1 Drawing Sheet

GAUGE FOR MOUNTING A SCREW

TECHNICAL FIELD

The present invention concerns a gauge for mounting screws.

BACKGROUND

In the aeronautic field in particular, there is frequently a need to assemble at least two parts together by screwing.

Such assembly requires prior fastening of a cage nut or a nut on the inner face of the innermost part, aligned with a transverse bore of the two parts, then introducing a screw into that bore from the outside, and screwing said screw in the cage nut or in the nut.

As is shown in the appended FIG. 1, the screws used for this type of application are screws 1 comprising a shank 3 whereof only the end 5 is threaded, the intermediate portion 7 of the shank 3 extending between said threaded end 5 and the head 9 of the screw being smooth.

This smooth portion 7, designed to pass through the thickness of the two parts, corresponds to the "grip", i.e. the thickness of materials to be gripped before application of a tightening torque.

By language extension, one often talks about the "grip" of the screw 1 to designate the length of the smooth portion 7.

The transition zone between the threaded portion 5 and the smooth portion 7 of the shank 3 defines a shoulder 11 which must never abut on the cage nut or on a nut when the threaded portion 5 of the screw is completely screwed inside the cage nut or the nut.

One therefore understands why for the assembly of two parts to be solid, the "grip" 7 of the screw must be such that in this screwed position, the head 9 of the screw 1 is pressed against the outer part.

Currently, to find the screw suitable for each bore of the aforementioned type, it is necessary to try several screws having different "grips", which is inconvenient and takes up time.

BRIEF SUMMARY

The present invention aims in particular to provide a tool making it possible to simply and immediately determine the length of a screw designed to cooperate with a cage nut or a nut to assemble at least two parts.

This aim of the invention is achieved with a gauge for mounting a screw in a cage nut or in a nut, with the aim of assembling at least two parts, this screw including a head and a shank with a smooth section and a threaded end, this gauge comprising a shank with a smooth section having graduations and with a threaded end, which are similar to those of said screw, and a sleeve slidably mounted on said smooth portion, the axial length of said sleeve and the distribution of said graduations being such that, when the shank of said gauge is screwed as far as it will go into said cage nut or into said nut and when said sleeve is pressed against one of said two parts, the graduation indicated by said sleeve on said smooth section is representative of the distance separating the thread of said cage nut or said nut from the outer surface of the part situated facing away from this cage nut or said nut.

This distance being equal to the "grip" of the appropriate screw, i.e. the screw whereof the smooth portion will have the right length appropriate to allow gripping of the parts to be assembled between the head of the screw and the cage nut or the nut once this screw has been screwed in said cage nut or in said nut, it is understood that the gauge according to the invention provides, very simply and quickly, an indication on the suitable screw for a given assembly.

It is thus no longer necessary to proceed by trial and error to find the appropriate screw for a given assembly: one can therefore save considerable time.

According to other optional features of the gauge according to the invention:

- the shank of said gauge is topped with a knurled head: this knurled head facilitates gripping of said gauge;
- the sliding sleeve of said gauge is knurled: this knurling facilitates gripping of said sleeve;
- the sliding sleeve of said gauge comprises a beveled panel: this beveled panel facilitates gripping of said sliding sleeve;
- the graduations appearing on the smooth portion of the shank of said gauge indicate screw "grips".

BRIEF DESCRIPTION OF THE DRAWINGS

Other features and advantages of the present invention will appear in light of the following description, and upon examination of the appended figures, in which.

DETAILED DESCRIPTION

Figure 4:
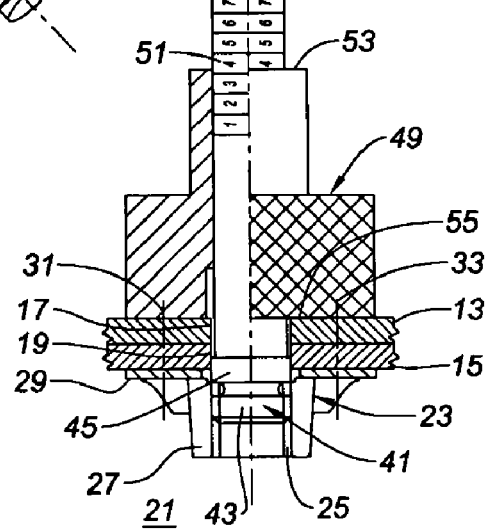
FIG. 4 illustrates, in axial cross-section (this cross-section being partial for the sliding sleeve) and on a larger scale than in FIG. 2, the gauge according to the invention cooperating with two parts designed to be assembled with a screw of the type illustrated in FIG. 1.

The parts to be assembled are illustrated diagrammatically in FIG. 4, and can thus typically comprise an outer plate 13 and an inner plate 15, these two plates being provided with respective coaxial bores 17 and 19.

The terms "outer" and "inner" are used in reference to a closed volume such as a casing 21 whereof these two plates define the jacket.

On the inner face of the inner plate 15, and coaxially to the bores 17, 19, is fastened a cage nut 23 (or, in an alternative not shown, a nut), provided with an inner thread 25.

Such a cage nut is commonly used in the aeronautics field, and essentially comprises a nut 27 integral with a platen 29, said platen being attached on the inner plate 15 by suitable fastening means, symbolized by the broken lines 31 and 33.

Figure 1:
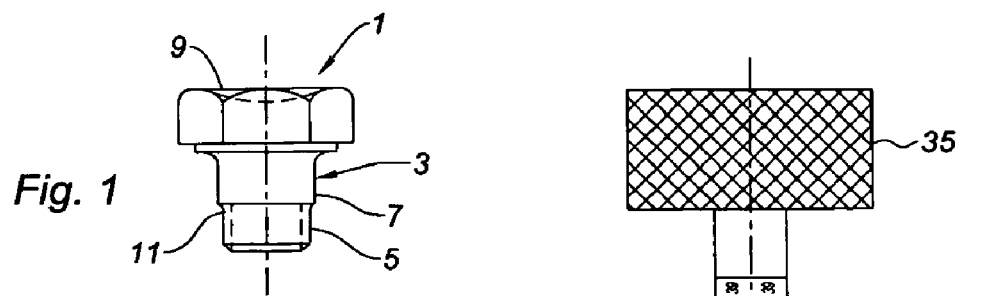
FIG. 1 illustrates an elevation view of a screw described in the preamble of this description, designed to cooperate with a cage nut or with a nut for the assembly of at least two parts capable of defining a closed casing.

The issue is therefore to find a screw of the type of that shown in FIG. 1 which makes it possible to perform a solid assembly of two plates 13 and 15 when it cooperates with the cage nut 23 or with a nut (not shown).

More precisely, it is necessary to find a screw 1 having a "grip", i.e. a length of smooth portion 7, which makes it possible, when the thread 5 of said screw is engaged in that 25 of the cage nut 23 or of a nut (not shown) without the shoulder 11 of said screw abutting against said thread, to ensure that the head 9 of said screw grips the outer plate 13, thereby allowing a solid assembly of the two plates 13 and 15.

Figure 2:
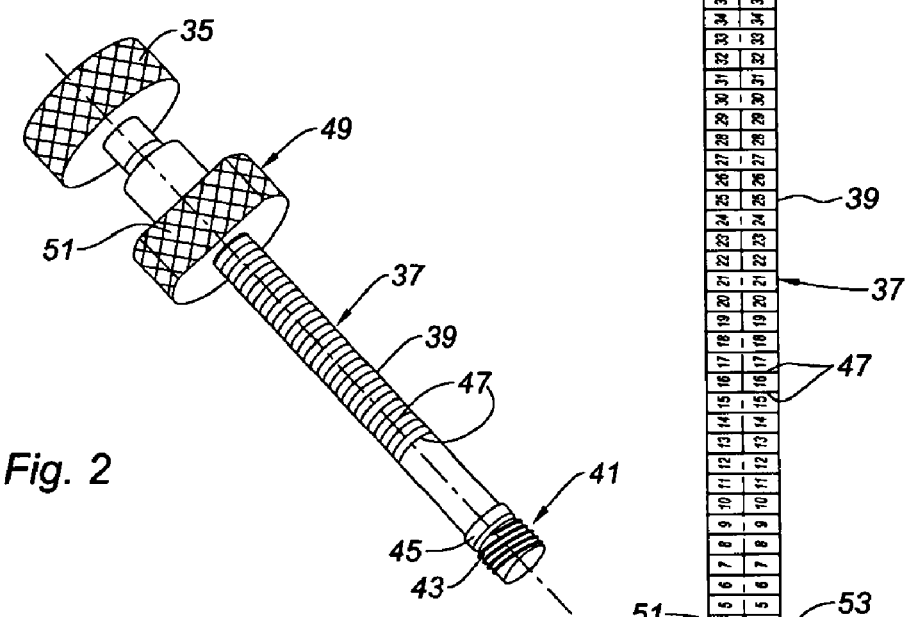
FIG. 2 illustrates, in perspective, a gauge according to the invention.
Figure 3:
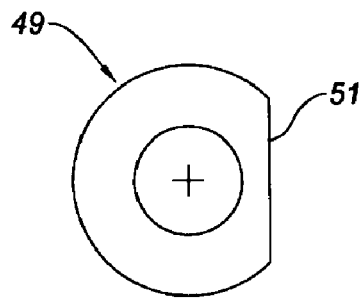
FIG. 3 illustrates an axial view of the sliding sleeve of the gauge according to the invention.

To find the appropriate screw, one uses the gauge illustrated in FIGS. 2 to 4.

As shown in these figures, this gauge comprises a head 35, preferably knurled, and a shank 37 including a smooth intermediate portion 39 and a threaded end 41 identical to the threaded end 5 of the screw 1.

More precisely, the threaded end 41 includes, on one hand, a thread 43 identical to that 5 of the screw 1, and on the other hand, an abutment shoulder 45 similar to the shoulder 11 of the screw 1.

The smooth portion 39 of the shank 37 includes, over practically all of the distance separating the head 35 from the thread 41, a series of regularly distributed graduations 47.

A sleeve 49, preferably knurled, is mounted slidably on the shank 37, between the head 35 and the thread 41.

As shown in FIG. 3, this sleeve preferably includes a flat portion 51.

The use of the gauge according to the invention will now be explained.

To choose the screw 1 that is suitable for the assembly of the plates 13, 15 illustrated in FIG. 4, one grasps the gauge of FIG. 2 by its head 35, and engages the threaded portion 41 of that gauge in the bores 17, 19 and in the thread 25 of the cage nut 23 or a nut (not shown).

One then screws said threaded end 41 into the cage nut 23, using the knurled head 35, until the shoulder 45 of said gauge abuts against the end of the thread 25 of the cage nut 23 or a nut (not shown).

Once the gauge is positioned in this way, one slides the sleeve 49 toward the outer plate 13, until said sleeve is pressed against the latter, as shown in FIG. 4.

One then reads the graduation indicated by the edge 53 of the sleeve 49 opposite the outer plate 13.

This graduation, the value of which is indicated in "grip" (unit representative of the length of the smooth portion 7 of the screw 1), makes it possible to immediately know the appropriate "grip" for the screw 1.

It is indeed understood that when the sleeve 49 is pressed against the outer plate 13, the edge 55 of said sleeve that comes into contact with said plate 13 is separated from the thread 25 by a distance exactly representative of the appropriate "grip" for the screw 1, such that the graduation indicated by the other edge 53 of the sleeve 49 is directly representative of the appropriate screw length.

Advantageously, the graduations appearing on the portion 39 of the shank 37 are in "grip" and thus correspond directly to corresponding screw lengths.

As can be understood from the preceding description, the present invention provides a gauge of extremely simple design, actuated manually, making it possible to very precisely and quickly determine the appropriate "grip" for a screw to assemble at least two parts by passing through them and cooperating with a cage nut or a nut.

Of course, the present invention is in no way limited to the embodiment described and illustrated, provided as a simple example.

The invention claimed is:

1. A gauge for mounting a screw in a cage nut with an aim of assembling at least two parts, the screw including a head and a shank with a smooth intermediate section and a threaded end, and the cage nut including a threaded bore and an unthreaded bore delimited by a nut shoulder disposed at an interior of the cage nut, the gauge comprising a shank with a smooth section having graduations and with a threaded end including threading and a gauge abutment shoulder, the threading being similar to threading of the screw, and a sleeve slidably mounted on said smooth section, an axial length of said sleeve and a distribution of said graduations being configured and positioned so that when the shank of said gauge is screwed into the cage nut such that said gauge abutment shoulder abuts the nut shoulder and said sleeve is pressed against one of said two parts, the graduation indicated by said sleeve on said smooth portion is representative of a distance separating the threaded bore of the cage nut from an outer surface of the part situated facing away from the cage nut.

2. The gauge according to claim 1, wherein said shank is topped by a knurled head.

3. The gauge according to claim 2, wherein said sliding sleeve is knurled.

4. The gauge according to claim 2, wherein said sliding sleeve comprises a beveled panel.

5. The gauge according to claim 2, wherein the graduations appearing on the smooth portion of the shank of said gauge indicate screw "grips".

6. The gauge according to claim 1, wherein said sliding sleeve is knurled.

7. The gauge according to claim 6, wherein said sliding sleeve comprises a beveled panel.

8. The gauge according to claim 6, wherein the graduations appearing on the smooth portion of the shank of said gauge indicate screw "grips".

9. The gauge according to claim 1, wherein said sliding sleeve comprises a beveled panel.

10. The gauge according to claim 9, wherein the graduations appearing on the smooth portion of the shank of said gauge indicate screw "grips".

11. The gauge according to claim 1, wherein the graduations appearing on the smooth portion of the shank of said gauge indicate screw "grips".

* * * * *